United States Patent [19]
Hall

[11] 3,759,224
[45] Sept. 18, 1973

[54] AQUARIUM
[75] Inventor: Frank Kenneth Hall, Saginaw, Mich.
[73] Assignee: O'Dell Manufacturing Inc., Saginaw, Mich.
[22] Filed: Dec. 17, 1971
[21] Appl. No.: 209,101

[52] U.S. Cl. .................................................. 119/5
[51] Int. Cl. ........................................ A01k 64/00
[58] Field of Search .................. 119/5; 220/82, 4 R

[56] References Cited
UNITED STATES PATENTS

| | | |
|---|---|---|
| 3,651,975 | 3/1972 | Callan .............................. 119/5 X |
| 3,152,574 | 10/1964 | Stout .................................. 119/5 |
| 2,713,847 | 7/1955 | Blaise ................................ 119/5 |
| 2,792,811 | 5/1957 | Chiaro ............................... 119/5 |
| 3,167,051 | 1/1965 | Hovlid ............................... 119/5 |

*Primary Examiner*—Hugh R. Chamblee
*Attorney*—John F. Learman et al.

[57] ABSTRACT

An aquarium having vertically spaced apart, enveloping, upper and lower integral frames holding a plurality of transparent side walls in sealed engagement, the lower frame member during assembly of the aquarium functioning to initially locate and support the side walls and a transparent bottom wall, and the upper frame functioning to assist the lower frame to hold the side walls while adhesive applied to join them in sealed relation is curing.

11 Claims, 6 Drawing Figures

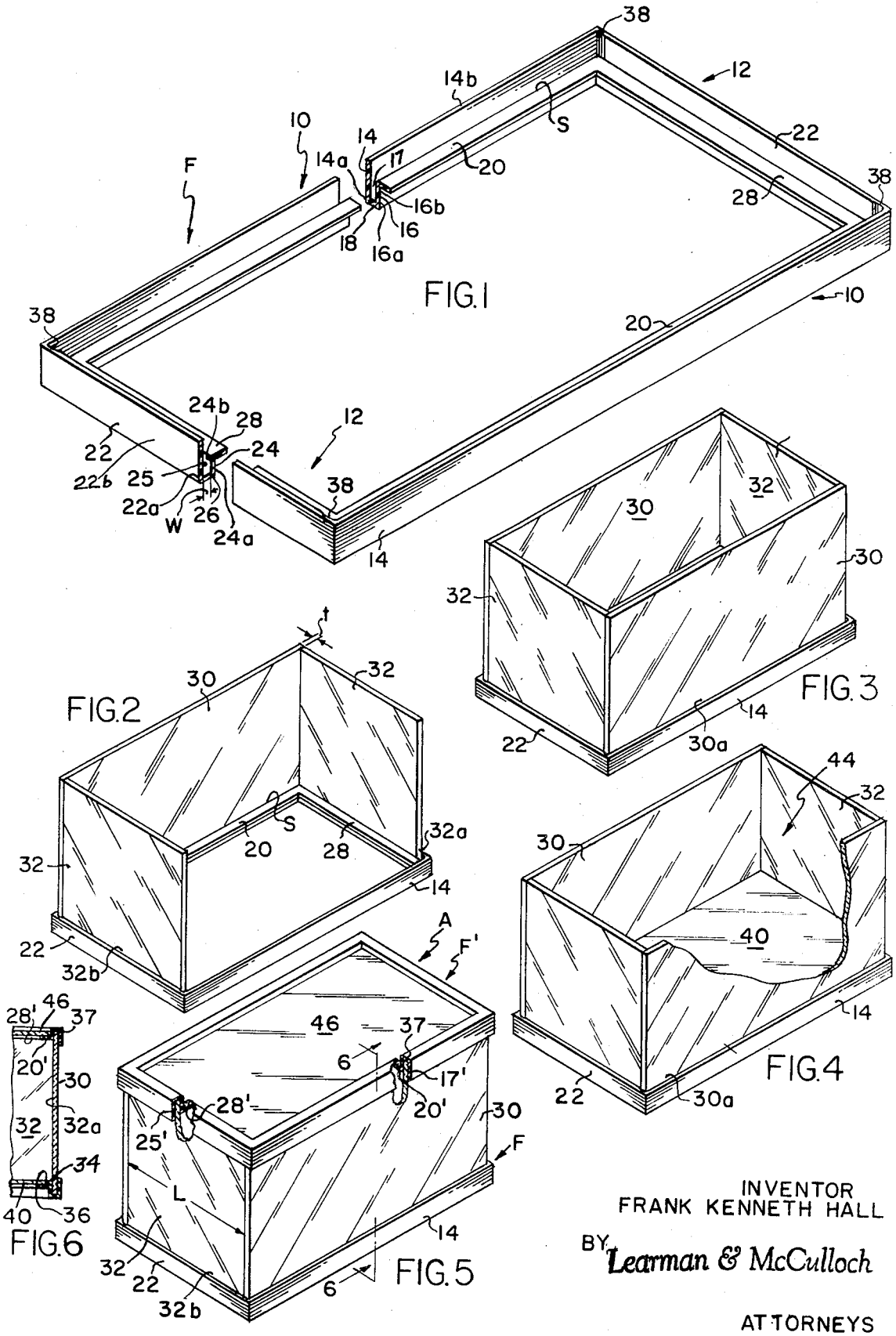

AQUARIUM

FIELD OF THE INVENTION

This invention relates to aquariums, and more particularly to a new and improved aquarium and a new and improved method of assembling an aquarium which does not require fixtures for retaining the walls during assembly.

BACKGROUND OF THE INVENTION

In the present day assembly of aquariums, some of the aquarium parts or components are generally held in a jig or fixture while other aquarium parts are being joined to them. Substantial manual labor is required to assemble the aquarium parts and to manipulate the retaining fixtures. It is an object of the present invention to decrease the time required to assemble an aquarium.

It is yet another object of the present invention to provide a new and novel method of assembling an aquarium which does not use fixtures for retaining the various aquarium parts during assembly.

It is a further object of the present invention to provide an aquarium with a unitary side wall enveloping frame construction which may be selectively used as either the bottom frame member or the upper frame member.

It is a still further object of the present invention to minimize the overall cost of manufacturing an aquarium.

Other objects and advantages of the present invention will become apparent to those of ordinary skill in the art as the description thereof proceeds.

SUMMARY OF THE INVENTION

An aquarium comprising top and bottom side wall enveloping frames, at least the bottom frame member including outer and inner vertical wall means spanned by additional wall means integrally formed therewith to define a perimetrically extending, open ended slot, the bottom frame including generally perimetrically extending support flange means formed integrally with and extending inwardly of said inner wall means, a plurality of abutting side wall sections spanning said upper and lower frame members and received in said slot; a bottom wall section disposed between said side wall sections and supported by said support flange means; and means for sealing said side wall sections to the adjacent side wall section and the bottom wall section to provide a water-tight enclosure. During assembly, the frames clamp the side walls and bottom wall in assembled position while adhesive which is used to join them cures or sets.

The present invention may more readily be described by reference to the accompanying drawings in which:

FIG. 1 is a top perspective view of an aquarium frame member constructed in accordance with the principles of the present invention, one side and one end of the frame member being split to more clearly illustrate the configuration of the outer and inner wall sections thereof;

FIG. 2 is a top, perspective view illustrating an initial step in assembling the aquarium wherein the side walls of the aquarium are vertically held by a lower frame member;

FIG. 3 is a top perspective view illustrating a subsequent step in assembling the aquarium, wherein the end wall members of the aquarium are vertically held by the lower frame between the side wall members of the aquarium;

FIG. 4 is a similar view illustrating a further step in the assembly wherein the lower wall of the aquarium is inserted and placed in position on the lower frame;

FIG. 5 is a perspective view of the assembled aquarium and also illustrates a further step in the assembly of the aquarium wherein the upper frame is placed over the top of the side and end walls of the aquarium; and FIG. 6 is a sectional end view taken along the line 6—6 of FIG. 5.

GENERAL DESCRIPTION

An aquarium constructed according to the present invention, is generally designated A (FIG. 5), and includes upper and lower frame members F and F', transparent glass side walls 30 spanned by transparent glass end walls 32, a transparent bottom wall 40, and a transparent top wall 46. The frame members F and F' are identical and interchangeable and function in the assembly of the component parts in a manner which will later be described.

INTERCHANGEABLE FRAME MEMBERS

The injection molded plastic side wall enveloping frames F and F' are identical and accordingly only frame F will be described. Frame F comprises side and end frame portions 10 and 12 respectively, which are integrally formed to provide a unitary construction that facilitates rapid assembly of the aquarium A as will become apparent hereinafter. Each of the side portions 10 includes an outer vertical wall section 14 and an inner vertical wall section 16 spanned by a bridging wall section 18 to define an upwardly opening slot 17 for snugly receiving one of the aquarium glass side walls 30. Although the lower ends 14a and 16a of the outer and inner wall sections 14 and 16 are coterminus, the upper end 14b of the outer wall 14 terminates substantially above the upper end 16b of the inner wall 16. A bottom wall supporting flange 20 extends inwardly from the upper edge 16b of each inner wall 16 for supporting the lower transparent glass wall 40 as will be described more particularly hereinafter.

The end frame portions 12 each include an outer vertical wall section 22 and an inner vertical wall section 24 spanned by a horizontal bridging wall section 26 and defining an upwardly opening slot 25 in communication with the side slots 17 for receiving one of the aquarium glass end walls 32. The lower ends 22a and 24a of the outer and inner frame wall sections 22 and 24 are coterminus, however, the upper end 24b of the inner wall 24 terminates substantially below the upper end 22b of the outer wall 22. Extending inwardly from the upper end 24b of each inner wall 24 is an inwardly directed wall supporting flange 28 for supporting, with the flanges 20, the bottom glass wall 40 as will be described more particularly hereinafter.

The glass supporting walls 14, 16 and 18 of the side frame sections 10 are integrally formed with the glass supporting walls 22, 24 and 26, respectively, of the end frame sections 12 to provide enveloping walls defining a continuous aquarium wall-receiving slot, generally designated S, having side and end slot sections 17 and 25. The side and end, bottom glass wall supporting flanges 20 and 28 are also integrally formed.

The frames F and F' are particularly adapted for use in assembling the transparent, glass side walls 30 and end walls 32 which are respectively snugly received in the slots 17 and 25.

The glass side walls 30 are pre-cut sections which conventionally are cut to a 1/16 inch lengthwise tolerance. To account for this tolerance, the end wall members 12 each include a pair of vertical recesses 38, in longitudinal alignment with the aquarium wall-receiving side slots 17, for accommodating the ends 30a of the glass side walls 30 when necessary.

The length L of the glass end walls 32 is, for practical purposes, equal to the length of the inner end wall sections 24 and also equal to the distance between the glass side walls 30 received in the side slots 17. The glass end walls 32 may be cut from "pre-cut" glass sections conventionally cut to a 1/16 inch lengthwise tolerance. If the "pre-cut" sections 30 are then evenly cut into four end pieces 32, each piece will be of equal length within a tolerance of 1/64 of an inch. The thickness $t$ of the glass end and side walls 32 and 30 is equal to the width $w$ of the slots 17 and 25, so that the glass walls 30 and 32 are held tightly between the walls 14, 16 and 22, 24 respectively in a vertically disposed position. The bottom wall 40 of the aquarium A is supported on the inwardly disposed flanges 20 and 28 and has a length substantially equal to the distance between the aquarium end walls 32 received in the slots 25 and a width substantially equal to the distance between the glass side walls 30 received in the side slots 17. Full length, continuous beads 34 of conventional translucent, water impervious adhesive sealant, i.e. General Electric Company silicone cement RTV–108, are disposed between the adjacent side and end members 30 and 32 and full length, continuous beads of sealing cement 36 are also disposed between the wall members 30 and 32 and the adjacent wall sections 14 and 22, and the bottom wall 40 and the flanges 20 and 28, to provide a leak-proof chamber 44 in which water may be indefinitely held. No bead is required between the edges of the bottom wall 40 and wall members 30 and 32.

The identical frame F' is placed atop the glass side walls 30 and 32 so that the downwardly opening slots 25 and 17 receive the upper ends of the aquarium glass end walls 32 and side walls 30. Full length, continuous beads of suitable sealing compound or cement 37 are placed between the upper ends of the glass side and end walls 30 and 32 and the frame F' to provide a waterproof seal. The frame F' includes inwardly disposed flange portions 20' and 28' supporting a top glass wall 46 which provides a removable closure for the opening in the upper end of the aquarium.

THE METHOD OF ASSEMBLING THE AQUARIUM

The frames F and F' play an important role in the assembly of the aquarium A. The aquarium A is assembled by firstly running a bead of sealing cement 36 along the lower outer surface 30a of the glass side walls 30 and then placing one of the glass side walls 30 in the longitudinal slot 17 of the frame F in the position shown in FIG. 2. The glass wall supporting side wall section 10 of the frame F is sufficiently rigid to maintain the glass side wall 30 in the vertically true upright position illustrated in FIG. 2 without an auxiliary holding jig or fixture. A plurality of beads 34 of sealing cement are then run along the vertical marginal edges 32a and the lower outer edge surfaces 32b of the glass end walls 32 which are then placed in the slots 25, provided in the end sections 12 of the frame F, to abut the glass side wall 30 as illustrated in FIG. 2. Then the opposite side wall 30, which is provided with a like bead of cement 30 along its lower water edge, is placed in the opposite slot 17 of frame F to abut end walls 32 (see FIG. 3). The end and side glass supporting wall sections 10 and 12 have sufficient rigidity and strength to maintain the snugly fitting glass side walls 30 and 32 in the structurally bonded vertically true, upright position shown in FIG. 3 without use of any auxiliary positioning jig or form. A continuous perimetrical edge bead 36 of sealing cement is placed on the underside of the slightly undersize, (i.e. 1/16 of an inch all around to facilitate insertion) bottom glass wall 40 of the aquarium A before it is inserted through the opening in the upper end of the aquarium between the side and end glass walls 30 and 32 and moved downwardly to an adhesively secured position on the flange members 20 and 28 on the side and end frame members 10 and 12 (see FIG. 4).

The upper frame member F', which is as noted, identical to the lower frame F, but inverted relative thereto, is thence placed over the side walls 30 and 32 and moved downwardly relative thereto so that the upper ends of the side walls 30 and 32 are received in the slot portions 17' and 25'. Prior to moving the frame F' into position, a suitable adhesive 37 is placed on the upper outer edge surfaces of the glass walls 30 and 32 to structurally bond the frame F' thereto. The top closure glass wall 46 is then placed on the flange members 20 and 28 of the upper frame F' to complete the aquarium. The completed aquarium is then passed through an adhesive drying or curing oven to set the adhesive sealant and permanently glue the various components in permanent assembled relation. The frames F and F' are structurally bonded to the glass and operate, as a vise, to hold the glass walls together and as additional protection against stress otherwise causing leaks in the tank. When set, the sealant is somewhat elastic in quality and can deform without rupturing. Thus, with the so-called "floating" (undersize) bottom wall, the aquarium can be placed on a stand which is not entirely level and some relative change of position is possible without cracking the glass walls.

It is to be understood that the drawings and descriptive matter are in all cases to be interpreted as merely illustrative of the principles of the invention, rather than as limiting the same in any way, since it is contemplated that various changes may be made in various elements to achieve like results without departing from the spirit of the invention or the scope of the appended claims.

I claim:

1. An aquarium comprising:
   continuously integrally extending, vertically spaced, unitary, top and bottom frames, at least said bottom frame including
      a perimetrically extending wall having a plurality of relatively angularly disposed, vertical wall means, and
      additional wall sections, including generally horizontal, wall supporting portions, integrally joined to said vertical wall means to define a plurality of relatively angularly disposed recess means and also including laterally inwardly extending flange means,
   said aquarium also comprising:

a plurality of adjacent, relatively angularly disposed, at least partly transparent, side wall sections, having vertically abutting vertically extending edge portions spanning said upper and lower frames and lower edge portions received in said recess means to form an enveloping side enclosure;

a bottom wall section supported by said flange means, and having edge portions in abutting engagement with said edge portions of said side wall sections; and means for sealing said side and bottom wall edge portions and said frames together including means for sealing each side wall section to the contiguous side wall section along the entire exposed vertical edge portion thereof, and sealing said bottom wall section along the entire edge portions thereof to provide a water-tight enclosure;

the frame vertical wall means having internal, vertical groove means receiving protruding vertically extending edge portions of the at least partly transparent side wall sections recieved in the recess means of the contiguous, angularly disposed, frame vertical wall means.

2. The aquarium set forth in claim 1 wherein said top and bottom frames are identical and include vertically aligned openings therein, said additional wall sections comprising vertical inner wall means and an additional wall spanning said inner wall means and said vertical wall means to define a perimetrically extending, open ended slot, said flange means formed integrally with and extending inwardly from said inner wall means.

3. The frame set forth in claim 2 wherein said vertical and inner wall means comprise a pair of continuous integral walls spanned by said additional wall.

4. The frame set forth in claim 2 wherein said support flange means is disposed interjacent the ends of said vertical wall means.

5. The frame set forth in claim 4 wherein said inner vertical wall means has a terminal end terminating below said vertical wall means, said support flange extending inwardly of the terminal end thereof.

6. The aquarium set forth in claim 1 wherein said internal vertical groove means is provided in said vertical wall means outward of the side wall section for receiving edge portions of contiguous side wall sections.

7. The combination defined in claim 1 in which said bottom wall section is perimetrically undersize and elastomerically bonded over its entire perimetrical edge to said generally horizontal wall supporting flanges, said bond comprising continuous sealant bead means, which is elastic when cured, bonding said bottom wall section to said horizontal wall supporting flanges.

8. An aquarium comprising: continuously integrally extending, vertically spaced, unitary, synthetic plastic, top and bottom frames; at least said bottom frame including a perimetrically extending continuous member comprising a plurality of relatively angularly disposed, integrally connected, outer vertical wall sections connected with parallel integrally connected inner vertical wall sections spaced therefrom by integrally connected laterally extending wall section means to define a continuous perimetrical slot means therebetween; a plurality of relatively angularly disposed, side panel sections, at least some of which are transparent, received within said slot and spanning said frame sections; said slot having at least portions of a width to snugly receive each of the side panel sections and support them in upright position; said side panel sections being relatively arranged with vertically abutting lapping edges to permit said side panel sections to form a sealed side enclosure; at least one of said side panel sections having a protruding vertical edge portion extending beyond the side panel section with which the edge of said one side panel section is in vertically abutting relation; inset, vertically extending groove means provided in one of the bottom frame vertical wall sections which extends angularly to the vertical wall section in which the panel section with the protruding edge portion is received, forming a continuation of the slot means in which said panel section with the protruding edge portion is received and receiving said protruding edge portion; a bottom panel section closing said bottom frame and means for sealing engaged panel sections and frame sections to provide a watertight enclosure.

9. The combination defined in claim 8 in which said side panel sections comprise glass side parts and glass end parts received between them, and said bottom frame inner and outer vertical wall sections likewise comprise corresponding side parts and end parts; the vertical edges of the glass side parts protruding beyond the glass end parts received between them; said inset vertical recess means to receive the protruding edges being provided in the inner face of each end of the outer wall of the bottom frame end parts, opening through the tops thereof.

10. The combination defined in claim 8 in which an inwardly extending perimetrical lateral flange, having side and end portions, is provided on said inner vertical wall sections; and said bottom panel section is supported thereon and sealed thereto.

11. A water-tight aquarium comprising: continuously integrally extending, vertically spaced, horizontal, unitary rigid, centrally open, top and bottom injection molded, identical plastic frames; each frame including a perimetrically extending prismatic continuous wall comprising a pair of integrally connected inner and outer vertical wall sections spaced apart by lateral wall means to define a glass side panel receiving slot means between them; said identical frames being oppositely disposed with their perimetrical slots in confronting vertical alignment; the inner vertical wall of each frame terminating in a continuous horizontal flange; a plurality of relatively perpendicularly disposed side glass panels having their upper and lower edges received within said confronting slots in said frames; said side glass sections being relatively arranged at right angles with vertically abutting lapping edges to permit said side glass sections to form a completely transparent sealed glass side enclosure; an adhesive sealant between said lapping edges and between the frames and panels; at least one of said side panels having a protruding vertical edge portion extending beyond the side panel with which the edge of said one side panel is in vertically abutting relation; said frames comprising separate, non-connected members functioning together as a jig to hold said frames and glass in assembled relation for curing of said adhesive sealant; inset, vertically extending groove means in one of the bottom frame outer vertical wall sections, forming a continuation of the slot means in which said panel section with the protruding edge portion is received, receiving said protruding edge portion; and a bottom panel sealed to said horizontal flange on the bottom frame.

* * * * *

UNITED STATES PATENT OFFICE
CERTIFICATE OF CORRECTION

Patent No. 3,759,224      Dated September 18, 1973

Inventor(s) Frank Kenneth Hall

It is certified that error appears in the above-identified patent and that said Letters Patent are hereby corrected as shown below:

Column 2, line 16, change " F and F' " to -- F' and F --.

Column 3, line 38, delete "is" and insert -- may be --; line 40, after "32" insert --, particularly in smaller size aquariums, but to assure a seal, such a bead may be used --.

Column 4, line 4, change "30" to -- 36 --; same line change "water" to -- outer --; line 9, change "position to -- positions --.

Column 5, line 62, after "parallel" and "connected", insert -- , --; line 63, after "connected" insert -- , --; line 64, after "extending" insert -- , --.

Column 6, line 1, after slot (both occurrences) insert -- means --; lines 10 and 11, delete "inset, vertically extending groove means provided in"; line 14, after "received" insert -- being shaped to provide outwardly projecting vertically extending slot continuation means --; line 19, delete "engaged" and insert -- said --; same line, delete "and" and insert -- supported with said --; line 27, cancel "inset"; line 28, cancel "recess" and insert -- slot continuation --; line 30, after "wall" insert -- section --.

Signed and sealed this 19th day of March 1974.

(SEAL)
Attest:

EDWARD M. FLETCHER, JR.
Attesting Officer

C. MARSHALL DANN
Commissioner of Patents